United States Patent [19]

Elliott et al.

[11] Patent Number: 5,048,746
[45] Date of Patent: Sep. 17, 1991

[54] TUNNEL FOR FLUXLESS SOLDERING

[75] Inventors: Donald A. Elliott, Brossard; Vivian G. Power, Lambert, both of Canada

[73] Assignee: Electrovert Ltd., Ontario, Canada

[21] Appl. No.: 448,008

[22] Filed: Dec. 8, 1989

[51] Int. Cl.$^5$ ............... B23K 1/00; B23K 1/06; B23K 35/38; H05K 3/34
[52] U.S. Cl. ............... 228/180.1; 228/220; 228/262; 228/37
[58] Field of Search ............ 228/219, 220, 180.1, 228/180.2, 260, 262, 1.1, 37, 43, 42, 56.2

[56] References Cited

U.S. PATENT DOCUMENTS

| | | | |
|---|---|---|---|
| 4,538,757 | 9/1985 | Bertiger | 228/220 |
| 4,580,716 | 4/1986 | Barresi et al. | 228/219 |
| 4,600,137 | 7/1986 | Comerford | 228/180.2 |
| 4,632,291 | 12/1986 | Rahn et al. | 228/37 |
| 4,684,056 | 8/1987 | Deambrosio | 228/180.1 |
| 4,726,506 | 2/1988 | Kondo | 228/37 |
| 4,771,929 | 9/1988 | Bahr et al. | 228/180.2 |
| 4,921,156 | 5/1990 | Hohnerlein | 228/37 |

FOREIGN PATENT DOCUMENTS

| | | | |
|---|---|---|---|
| 2277 | 1/1977 | Japan | 228/220 |
| 95854 | 8/1978 | Japan | 228/180.1 |
| 37077 | 2/1989 | Japan | 228/180.1 |

OTHER PUBLICATIONS

Western Electric Technical Digest No. 44, "Tape Feed ... Through an Ultrasonically Activated Solder Bath", pp. 45, 46, Oct. 1976.
Metals Handbook, Ninth Edition, vol. 6, "Furnace Brazing of Steels", pp.929-948, copyright 1983.
Nitrogenius 1, Hartmann, H. J., "Softsoldering Under Cover Gases", 11-1989.
Lenz, Von Eduard, Automatisiertes Loten Elektronischer Baugruppen, Siemens Aktiengesellschaft, 1985.

Primary Examiner—Samuel M. Heinrich
Attorney, Agent, or Firm—Darby & Darby

[57] ABSTRACT

A tunnel for fluxless soldering, is a straight linear tunnel which contains vibrating means to vibrate a solder wave and a non-explosive gas atmosphere. The gas atmosphere includes a small portion of hydrogen or other gaseous reducing agent, sufficient to achieve a fluxing action. A process for soldering an element comprises the steps of conveying the element through a tunnel containing a non-explosive gas atmosphere substantially excluding oxygen, heating the element in the tunnel, soldering the element, and retaining the element in the gas atmosphere of the tunnel until solder on the element has solidified.

33 Claims, 2 Drawing Sheets

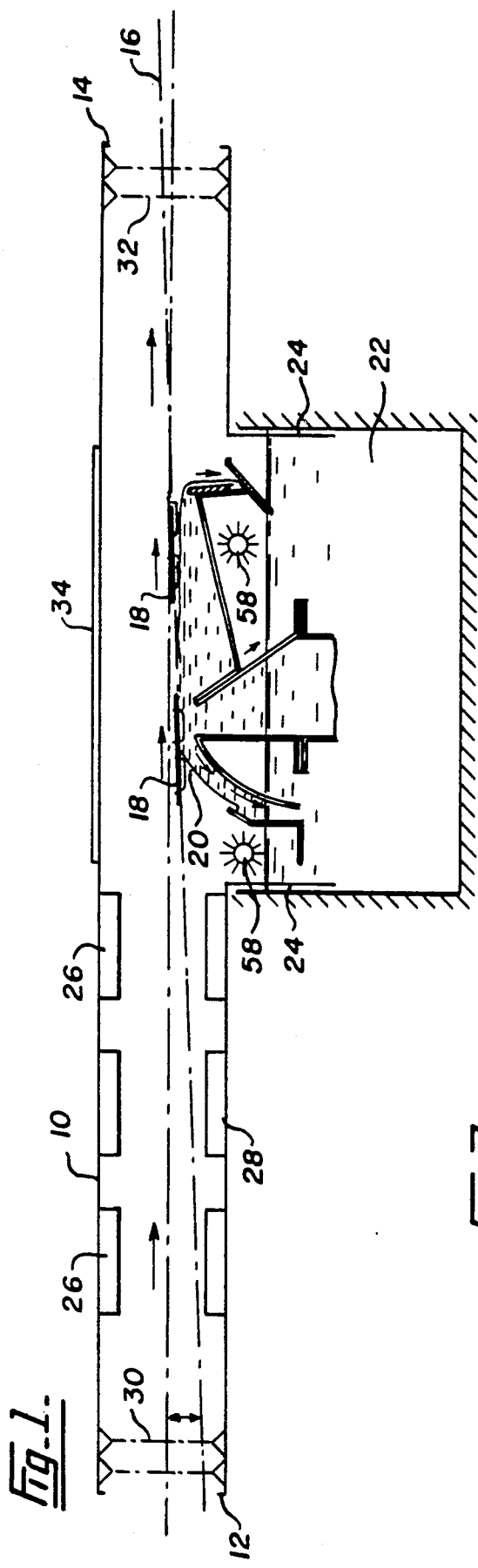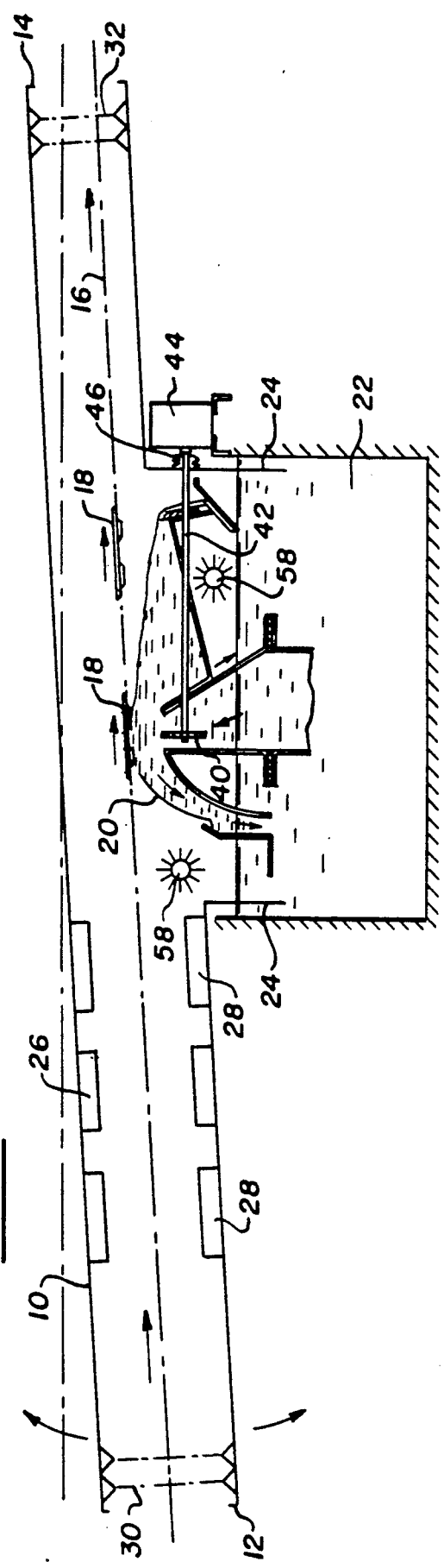

TUNNEL FOR FLUXLESS SOLDERING

BACKGROUND OF THE INVENTION

The present invention relates to soldering of elements such as printed wiring boards, and more specifically, the present invention relates to fluxless soldering in an nonexplosive gas atmosphere which substantially excludes oxygen.

When elements such as printed wiring boards and the like are soldered, it is invariably necessary to first apply a flux to promote wetting and good solder joints through removal of surface oxides on the metallic surfaces to be soldered. More recently inert gas soldering, generally nitrogen gas, sometimes with other inert gases have shown some benefits in the reduction of the amount of flux required in soldering. The inert gases cover the liquid solder surfaces and prevent oxidation of the solder. By eliminating flux and preventing oxidation of the solder, one avoids the necessity for cleaning the solder joints after soldering.

It has been suggested that a forming gas mixture which includes nitrogen and hydrogen has certain advantages for soldering, in that it is purported to promote hole filling in circuit boards without the use of flux. However, hydrogen in concentrations of 10% by volume or higher, presents handling difficulties and requires specific safety measures under certain conditions.

In U.S. Pat. No. 4,538,757 to Bertiger, soldering is accomplished in an atmosphere substantially free of oxygen and in a fluxing action occurs for soldering due to the presence of a gaseous reducing agent. A vent is shown from the center of an enclosure, and the gaseous reducing agent, referred to as hydrogen in one embodiment, is vented off through a burn off device. This seems to indicate that there is a sufficiently high proportion of hydrogen present that an explosive mixture may occur in the enclosure.

In our co-pending patent application filed Nov. 22, 1989, Ser. No. 441,009 is disclosed soldering in a shield gas atmosphere. The disclosure of this application is incorporated herein by reference.

AIMS OF THE INVENTION

It is an aim of the present invention to provide a tunnel enclosure which is a simple one piece tunnel and may be either horizontal or at a slope depending on the soldering requirements. The tunnel is sealed and contains a gas atmosphere which substantially excludes oxygen. A conveyor extends from one end to the other in the tunnel, and heaters are provided to heat elements conveyed on the conveyor. The elements are first heated and then soldered within the tunnel. Different types of soldering may occur within the tunnel such as reflow soldering, wherein solder paste is applied to top mounted metallized pads, the solder paste melts within the tunnel and flows to form solder joints. In another embodiment at least one solder pot is provided, and the tunnel has seals extending into the solder pot. One or more solder waves are formed above the solder pot, and the elements are carried on the conveyor to pass through the solder wave. In a still further embodiment a vibration or pressurizing effect may be applied to the solder wave, as the element passes through it, which causes the solder to flow to metallized plated holes in the element.

It is a further aim of the present invention to provide a gas atmosphere in a tunnel enclosure that substantially excludes oxygen, provides a fluxing action for soldering, but does not provide an explosive mixture in the enclosure that requires burn off at a vent. Furthermore venting that may be required from the enclosure can occur at gas curtains at an entry and an exit.

A still further aim is to provide a tunnel enclosure, into which is inserted a gas atmosphere which excludes oxygen and has hydrogen sufficient to provide a fluxing action up to about 10% by volume, but not sufficiently high to form an explosive mixture.

Another aim is to provide a tunnel enclosure with gas curtains and an entry and an exit, and in one embodiment the gas curtain at the exit assists in cooling soldered elements so the solder solidifies before exiting from the enclosure.

It is a further aim of the present invention to provide a tunnel enclosure which may be retrofitted onto existing soldering machines, both wave soldering and reflow soldering, so that the soldering occurs within an atmosphere that excludes oxygen, and this avoids the necessity of applying flux to the elements before soldering.

SUMMARY OF THE INVENTION

The present invention provides a process for soldering an element comprising the steps of conveying the element through a tunnel means containing a non-explosive gas atmosphere substantially excluding oxygen, heating the element in the tunnel means, soldering the element in the tunnel means, and retaining the element in the gas atmosphere of the tunnel means until solder on the element has solidified.

In another embodiment there is provided an apparatus for soldering an element comprising a tunnel enclosure for containing a non-explosive gas atmosphere substantially excluding oxygen, the enclosure having an entry and an exit, conveyor means for conveying an element through the tunnel from the entry to the exit, means to maintain the gas atmosphere within the enclosure, heating means to heat the element within the enclosure and soldering means to solder the element within the enclosure.

BRIEF DESCRIPTION OF THE DRAWINGS

In drawings which illustrate embodiments of the present invention by way of example, FIG. 1 is a side elevational view showing a tunnel enclosure according to one embodiment of the present invention, positioned above a solder pot and having a solder wave therein.

FIG. 2 is a side elevational view showing a tunnel enclosure according to another embodiment of the present invention, positioned above a solder pot and having a solder wave which is vibrated.

DETAILED DISCLOSURE OF THE INVENTION

Figure 3:
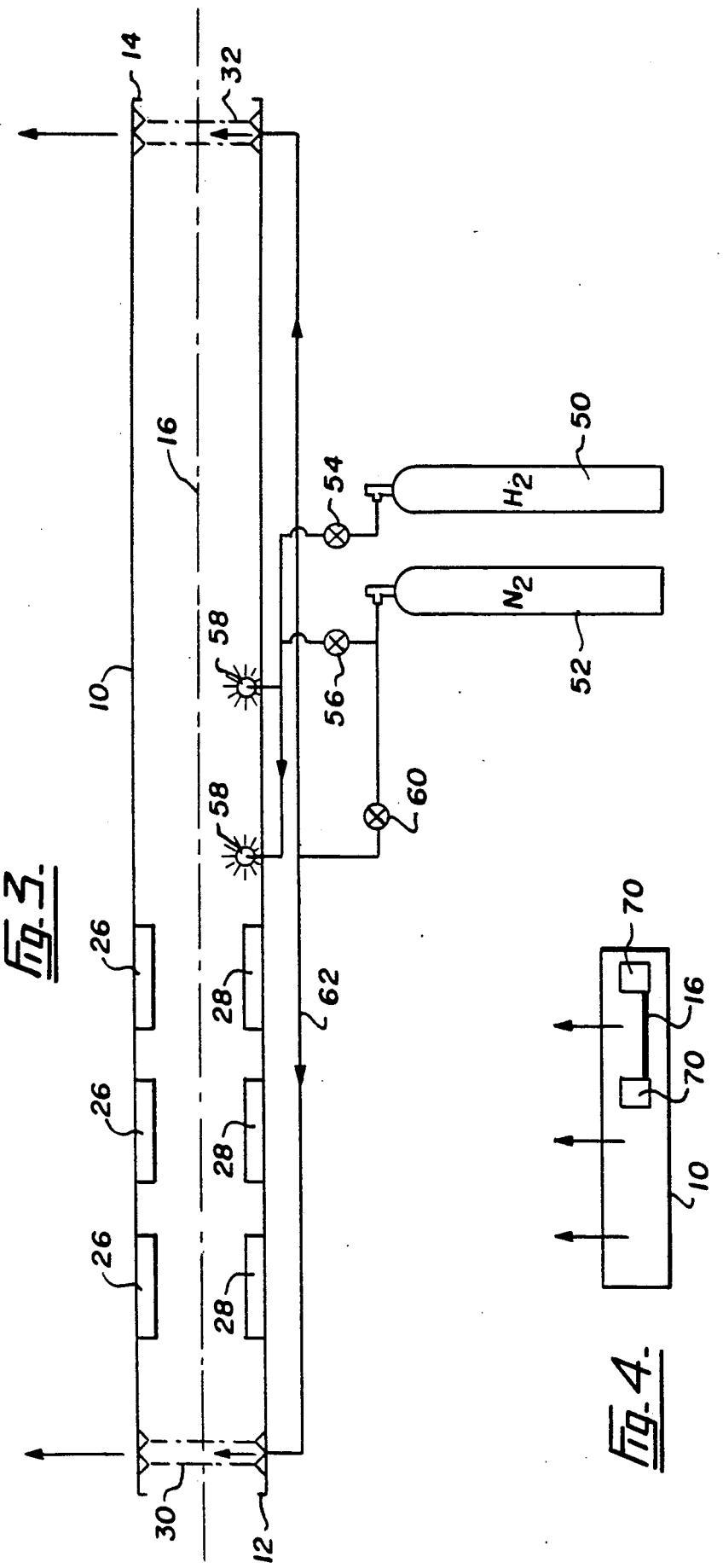
FIG. 3 is a side elevational view showing a tunnel enclosure according to a further embodiment of the present invention, having a conveyor therein with gas curtains at the entry and exit, and heaters above and below the conveyor.

A tunnel enclosure 10 is illustrated in FIG. 1, which is a one piece substantially horizontal tunnel having an entry 12 and an exit 14. The depth of the tunnel enclosure 10 is substantially the same throughout its length and has a conveyor 16 extending from the entry 12 to the exit 14 with an upward slope. Elements in the form of printed circuit boards 18 are transported by a single linear conveyor 16 and pass through a solder wave 20 which extends up from a solder pot 22. The solder wave 20 is of the type shown in U.S. Pat. No. 3,921,888 to Elliott et al.

The conveyor 16 is shown at a specific slope, however, a pivot arrangement permits this slope to be varied up to the horizontal position dependent upon the type of elements being soldered. In FIG. 1, the conveyor 16 may be tilted within the tunnel enclosure 10. A single linear conveyor is illustrated, however, two or more conveyors may be provided within the enclosure, particularly if the enclosure is retrofitted onto a known type of soldering device.

The enclosure 10 has skirts 24 which act as gas seals. The skirts 24 are shown extending down into the liquid solder in the solder pot 22. The skirts extend around the edges of the solder pot 22 to provide a complete sea between the tunnel enclosure 10 and the solder pot 22.

The tunnel enclosure 10 has a series of upper heater panels 26 and lower heater panels 28 which are provided to preheat the elements 18 as they are conveyed on the conveyor 16. Whereas heater panels 26 and 28 are shown on both the top and bottom, in some configurations the heater panels may be provided only on the top or only on the bottom dependent upon the requirement for soldering. The heater panels are preferably infrared heater panels, and in one embodiment are mounted in guides so they can slide for ease of removal and maintenance.

The tunnel enclosure 10 is sealed by having entry gas curtains 30 and exit gas curtains 32. The gas curtains may be of the type shown in U.S. Pat. No. 4,696,226 to Witmer. The disclosure of this patent is incorporated herein by reference. Whereas gas curtains are illustrated here, they may be replaced by vestibules having doors at each end to ensure that no air enters the tunnel enclosure 10 and no gas within the tunnel enclosure 10 escapes into the air. In another embodiment guillotine or swinging doors may be included with a single linear conveyor The tunnel enclosure 10 has a gas atmosphere which excludes substantially all oxygen, thus avoiding the necessity of fluxing elements to be soldered.

By the term "fluxing" used herein it is meant fluxing by the addition of a liquid or powder flux commonly applied to areas of elements to be soldered prior to soldering.

Other additives may be added to the tunnel enclosure such as adipic acid sprayed onto the elements to assist in cleaning oxides present on the circuit boards. Formic acid or other suitable cleansers may be included to keep the solder clean.

In one embodiment the tunnel enclosure 10 is filled primarily with nitrogen which is a suitable inert gas. Other inert gases which exclude oxygen may also be used. In a preferred embodiment under 10% of hydrogen by volume is included in the tunnel. The hydrogen, while not referred to as a flux, provides a fluxing action, and sufficient hydrogen to achieve a fluxing action is added while ensuring that a non-explosive mixture is present in the tunnel enclosure 10. The gas with the hydrogen is preferably nitrogen, and by the addition of hydrogen it is found that improved hole filing in circuit boards without the use of flux is achieved. By utilizing the hydrogen at less than 10%, safety and handling is easier. If the percentage of hydrogen increases much above 10% it is purported that there is a possible danger of explosion under certain conditions should the gas come in contact with air. Other types of gases that act as reducing agents and exclude oxygen may also be used in place oxygen provided a non-explosive atmosphere is maintained in the enclosure.

The exit gas curtain 32 in one embodiment, assists in cooling the elements 18 leaving the solder wave 20, to ensure that the solder has solidified in the solder joints within the gas atmosphere of the tunnel enclosure 10. Additional cooling arrangements may be included in the form of cooling coils in the tunnel enclosure 10 after the solder wave 20, to promote the solidification of the solder. The requirement for extra cooling depends on the particular elements to be soldered, tunnel length, and the speed of the conveyor and other variables.

The tunnel enclosure 10 has a window portion 34 on the top surface for viewing the soldering. Side windows (not shown) may also be provided if required.

The conveyor 16 in one embodiment has a series of fingers to support the elements 18 such as circuit boards thereon. In another embodiment the conveyor 18 supports the elements 18 on a pallet (not shown) which in turn is held by a conveyor chain on at least one side of the tunnel enclosure 10. The conveyor 16 in one embodiment is adjustable width, either to support pallets, or to support the elements 18 directly. A flat belt conveyor formed of material that is not affected by temperature or the environment of the operating conditions in the tunnel, is suitable for supporting and conveying elements 18 in one embodiment.

The solder pot 22 is lowerable as disclosed in our previous application Ser. No. 441,009. When the solder pot is lowered and swung out, maintenance on the solder wave nozzle can take place. After maintenance, the solder pot 22 is raised up and the skirts 24 attached to the tunnel enclosure 10 dip into the solder to form a sea.

FIG. 2 illustrates another embodiment wherein the tunnel 10 enclosure is slimmer than that shown in FIG. 1, and does not have an even depth throughout its length. The conveyor 16 is substantially parallel to the top and bottom surfaces of the tunnel enclosure 10 and is pivotable together with the conveyor 16 so that the conveyor slope can be varied up to a horizontal position.

The solder wave 20 shown in FIG. 2 has a vibrating vane 40 therein connected to a rod 42 joined to a vibrator 44. The connecting rod 42 passes through a seal 46 in the skirt 24 and vibration, preferably in the range of about 20 to 400 Hz, occurs during the passage of the element 18 through the solder wave 20. The arrangement of vibratory wave soldering is disclosed in U.S. Pat. No. 4,684,056 now Reissue U.S. Pat. No. Re. 33,197 to Deambrosio.

Whereas wave soldering with a single solder wave 20 is shown in FIGS. 1 and 2, in another embodiment, as illustrated and shown in co-pending application Ser. No. 441,009, two solder waves in line are provided. The upstream solder wave being a turbulent solder wave and the downstream solder wave being a vibratory solder wave. In a further embodiment two solder pots may be provided with the liquid solder in the first wave being at a lower temperature than in the second wave.

FIG. 3 shows a tunnel 10 with a conveyor 16 passing therethrough and top and bottom heater panels 26 and 28. The tunnel as shown in FIG. 3 is used for reflow soldering wherein solder paste is applied to metallized pads on the element to be soldered. Most solder paste used today includes a flux, however, if reflow soldering occurs in a gas atmosphere excluding oxygen and wherein a gaseous reducing agent provides a fluxing action then the solder paste need not include a flux. The solder paste melts in the gas atmosphere of the tunnel 10 after being heated by the heater panels 26 and 28. The solder then flows to form a solder joint and subsequently cools so that the solder solidifies before leaving the tunnel 10 at exit 14.

A gas supply arrangement is shown in FIG. 3. While this system is only illustrated in FIG. 3, it may equally well be applied to the embodiments shown in FIGS. 1 and 2. A hydrogen gas supply 50 and a nitrogen gas supply 52 each have valves 54 and 56 to control the flow and mixture of gases which enter the tunnel enclosure at spargers 58. These spargers 58 are also illustrated in FIGS. 1 and 2. Nitrogen gas also flows through a second valve 60 to a gas line 62 feeding the entry gas curtain 30 and the exit gas curtain 32. Venting from the tunnel enclosure 10 occurs at the entry gas curtain 30 and exit gas curtain 32. No vent is shown in the center of the enclosure where soldering occurs. Whereas a gas supply system shown here incorporates two separate supplies, premixed gases may also be used.

Figure 4:
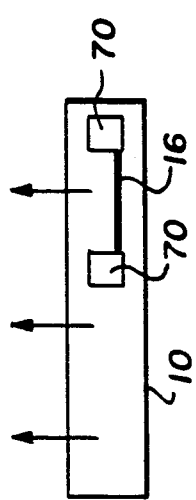
FIGS. 4 and 5 are end views of an entry to a tunnel enclosure of any of the types shown in FIGS. 1 to 3, showing adjustable width conveyor.
Figure 5:
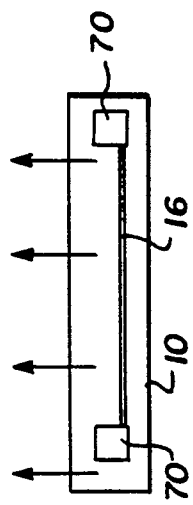

FIGS. 4 and 5 illustrate two types of conveyors 16 at the entry gas curtain 32 to the tunnel enclosure 10. The conveyor supports 70 are positioned for small boards in FIG. 4 and larger boards in FIG. 5. The adjustable width conveyor 16 may have fingers to support boards or may support boards on pallets.

In another embodiment, a combination of reflow soldering and solder wave soldering is applied to an element such as a printed wiring board. In such a process solder paste is applied to the top metallic circuit pads which melt, either as the element is passing adjacent the heaters 26 and 28, or alternatively as the pass through the solder wave. Solder from the solder wave wets the underside of the boards and due to the gas atmosphere which excludes oxygen, the solder wicks up into hard to solder areas.

The tunnel enclosure 10 in one embodiment is made as a retrofit for installation on existing soldering machines, both wave soldering and reflow soldering. The gas supply arrangement is provided separately with gas lines to the enclosure 10.

Various changes may be made to the embodiments shown herein without departing from the scope of the present invention which is limited only by the following claims.

The embodiments of the present invention in which an exclusive property or privilege is claimed are defined as follows:

1. A process for soldering an element without the application of flux comprising the steps of:
    conveying the element through a tunnel means containing a non-explosive gas atmosphere having less than about 10% by volume hydrogen, sufficient to achieve a fluxing action, the remaining gas being inert, and substantially excluding oxygen;
    heating the element in the tunnel means;
    passing the element through at least a portion of a solder wave in the tunnel means, at the same time providing a pressurizing effect in the solder wave using a moving device within the solder wave, and
    retaining the element in the gas atmosphere of the tunnel means until solder on the element has solidified.

2. The process for soldering an element according to claim 1 wherein the element is conveyed on a conveyor means passing from an entry to an exit of the tunnel means.

3. The process for soldering an element according to claim 2 wherein the conveyor means has an adjustable width within the tunnel means.

4. The process for soldering an element according to claim 2 wherein the conveyor means has an adjustable slope within the tunnel means.

5. The process for soldering an element according to claim 2 wherein the conveyor means has an adjustable slope and moves with the tunnel means.

6. The process for soldering an element according to claim 1 wherein the element in the tunnel means is heated from above.

7. The process for soldering an element according to claim 1 wherein the element in the tunnel means is heated from below.

8. The process for soldering an element according to claim 1 wherein the element in the tunnel means is heated from above and below.

9. The process for soldering an element according to claim 1 wherein the element is conveyed through gas curtain means at an entry to and an exit from the tunnel means to prevent air entering the tunnel means and gas escaping from the tunnel means.

10. The process for soldering an element according to claim 9 wherein the gas curtain means at the exit assists in cooling the element to ensure solder on the element has solidified prior to exiting from the tunnel means.

11. An apparatus for soldering an element without the application of flux comprising:
    a tunnel enclosure for containing a non-explosive gas atmosphere having less than about 10% by volume hydrogen with an inert gas, and substantially excluding oxygen, the tunnel enclosure having an entry and an exit,
    conveyor means for conveying an element through the tunnel enclosure from the entry to the exit,
    means to maintain the gas atmosphere within the tunnel enclosure,
    heating means to heat the element within the tunnel enclosure, and
    means to produce a solder wave to solder the element conveyed in the tunnel enclosure, and
    vibrating means to vibrate the solder wave as the element is conveyed in the tunnel enclosure.

12. The apparatus for soldering an element according to claim 11 wherein the tunnel enclosure comprises a one piece linear tunnel which is gas sealed.

13. The apparatus for soldering an element according to claim 11 wherein the tunnel enclosure and the conveyor means are pivoted together to vary slope of the conveyor means.

14. The apparatus for soldering an element according to claim 11 wherein the conveyor means comprises a single linear conveyor within the tunnel enclosure and including means to pivot the conveyor for varying the slope of the conveyor within the tunnel enclosure.

15. The apparatus for soldering an element according to claim 11 wherein the conveyor means is an adjustable width conveyor.

16. The apparatus for soldering an element according to claim 11 wherein the inert gas is nitrogen.

17. The apparatus for soldering an element according to claim 11 wherein the heating means includes heater panels mounted above the conveyor means.

18. The apparatus for soldering an element according to claim 11 wherein the heating means comprise heater panels mounted below the conveyor means.

19. The apparatus for soldering an element according to claim 11 wherein the heating means comprise heater panels mounted above and below the conveyor means.

20. The apparatus for soldering an element according to claim 11 wherein the heating means are heater panels on guides adapted to be slid out of the tunnel enclosure.

21. The apparatus for soldering an element according to claim 11 including gas curtains at the entry and exit to prevent air entering the tunnel enclosure and to prevent gas escaping from the tunnel enclosure.

22. The apparatus for soldering an element according to claim 21 wherein the gas curtains at the exit provide cooling to ensure solder on the element has solidified.

23. The apparatus for soldering an element according to claim 11 including a solder pot with seal means between the enclosure and the solder pot, the solder wave extending up from the solder pot for soldering an element conveyed on the conveyor means.

24. The apparatus for soldering an element according to claim 23 wherein the seal means comprises skirts extending down from the tunnel enclosure into the solder pot.

25. The apparatus for soldering an element according to claim 23 wherein the solder pot is lowerable beneath the tunnel enclosure for ease of maintenance.

26. An apparatus for soldering an element according to claim 11 wherein the tunnel enclosure comprises a retrofit tunnel enclosure adapted to be installed on an existing soldering machine.

27. The apparatus for soldering an element according to claim 23 including a cooling means in the tunnel enclosure after the solder wave and before the exit to ensure that solder on the element solidifies before the element leaves the tunnel enclosure.

28. The apparatus for soldering an element according to claim 1 wherein the vibrating means comprises a moving device vibrating within the solder wave.

29. A process for soldering an element without the application of flux comprising the steps of:
    conveying the element through a non-explosive gas atmosphere having less than about 10% by volume hydrogen, sufficient to achieve a fluxing action, the remaining gas being inert, and substantially excluding oxygen,
    passing the element through at least a portion of a solder wave in the non-explosive gas atmosphere, at the same time providing a pressurizing effect in the solder wave using a moving device within the solder wave.

30. The process for soldering an element according to claim 29 wherein the pressurizing effect is provided by vibrating the moving device in the range of about 20 to 400 Hz.

31. The process for soldering an element according to claim 29 wherein the element is conveyed through a tunnel means containing the non-explosive gas atmosphere.

32. An apparatus for soldering an element without the application of flux comprising:
    a tunnel enclosure for containing a non-explosive gas atmosphere having less than about 10% by volume hydrogen with
    an inert gas, and substantially excluding oxygen, the tunnel enclosure having an entry and an exit,
    conveyor means for conveying an element through the tunnel enclosure from the entry to the exit,
    means to maintain the gas atmosphere within the tunnel enclosure,
    means to produce a solder wave to solder the element conveyed in the tunnel enclosure, and
    vibrating means to vibrate the solder wave as the element is conveyed in the tunnel enclosure.

33. The apparatus for soldering an element according to claim 32 wherein the vibrating means comprises a moving device within the solder wave and vibrates in the range of about 20 to 400 Hz.

* * * * *